United States Patent
Zavesky et al.

(10) Patent No.: US 11,159,585 B2
(45) Date of Patent: Oct. 26, 2021

(54) CONTENT DELIVERY AND CONSUMPTION WITH AFFINITY-BASED REMIXING

(71) Applicant: AT&T Intellectual Property I, L.P., Atlanta, GA (US)

(72) Inventors: Eric Zavesky, Austin, TX (US); Nigel Bradley, McDonough, GA (US); James Pratt, Round Rock, TX (US); Timothy Innes, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 289 days.

(21) Appl. No.: 15/921,125

(22) Filed: Mar. 14, 2018

(65) Prior Publication Data

US 2019/0289043 A1    Sep. 19, 2019

(51) Int. Cl.
*H04L 29/06*    (2006.01)
*H04L 12/58*    (2006.01)
(Continued)

(52) U.S. Cl.
CPC ........ *H04L 65/1093* (2013.01); *H04L 51/063* (2013.01); *H04L 51/32* (2013.01);
(Continued)

(58) Field of Classification Search
CPC .................................................. H04L 65/1093
See application file for complete search history.

(56) References Cited

U.S. PATENT DOCUMENTS

| 7,451,084 B2 | 11/2008 | Funakura |
| 7,584,215 B2 * | 9/2009 | Saari ................... G06F 16/9535 |

(Continued)

FOREIGN PATENT DOCUMENTS

CN    107391581 A    11/2017

OTHER PUBLICATIONS

Baccianella, Stefano et al., "Sentiwordnet 3.0: an enhanced lexical resource for sentiment analysis and opinion mining", LREC. vol. 10. No. 2010. pp. 1-5.
(Continued)

*Primary Examiner* — Minh Chau Nguyen
*Assistant Examiner* — Ishrat Rashid
(74) *Attorney, Agent, or Firm* — Guntin & Gust, PLC; Jay H. Anderson

(57) ABSTRACT

Aspects of the subject disclosure may include, for example, a method in which a processing system obtains physical and social environmental data for a communication device user, and provides content for presentation at the device. First reaction data, obtained via sensors associated with the user, indicate the user's reaction to presentation of the content; the data is analyzed to determine user affinity for the content in a context of the physical and social environments. The content is modified during the presentation; second reaction data is obtained and analyzed to determine a second user affinity for the modified content. If the affinity is enhanced, the modified content is sent to other users' equipment via a social network. Affinity responses regarding the modified content are analyzed, and a set of users is identified as an affinity group; additional content is transmitted to equipment of the affinity group. Other embodiments are disclosed.

20 Claims, 11 Drawing Sheets

(51) Int. Cl.
*H04L 29/08* (2006.01)
*H04W 4/21* (2018.01)
*H04W 4/08* (2009.01)
*H04W 4/38* (2018.01)
*G06F 3/16* (2006.01)
*G06F 3/0484* (2013.01)

(52) U.S. Cl.
CPC ............ *H04L 65/601* (2013.01); *H04L 67/22* (2013.01); *H04L 67/306* (2013.01); *H04L 67/38* (2013.01); *H04W 4/08* (2013.01); *H04W 4/21* (2018.02); *H04W 4/38* (2018.02); *G06F 3/04845* (2013.01); *G06F 3/167* (2013.01)

(56) References Cited

U.S. PATENT DOCUMENTS

| | | | |
|---|---|---|---|
| 8,516,374 | B2 | 8/2013 | Roy et al. |
| 8,539,359 | B2 | 9/2013 | Rapaport et al. |
| 8,666,672 | B2 | 3/2014 | Winarski |
| 8,700,009 | B2 | 4/2014 | Quy et al. |
| 8,984,082 | B2 | 3/2015 | Weinstein et al. |
| 9,396,483 | B2 | 7/2016 | Hamedi |
| 9,510,788 | B2 | 12/2016 | Galeev |
| 9,536,269 | B2 | 1/2017 | Chang et al. |
| 9,544,382 | B2 | 1/2017 | Bosworth et al. |
| 9,569,986 | B2 | 2/2017 | Levine et al. |
| 9,734,451 | B2 | 8/2017 | Srinivasan et al. |
| 9,787,785 | B2 | 10/2017 | Liu |
| 9,801,547 | B2 | 10/2017 | Yuen et al. |
| 9,894,415 | B2 | 2/2018 | Knox |
| 10,536,542 | B1* | 1/2020 | Domer .................... H04L 51/10 |
| 2005/0223237 | A1* | 10/2005 | Barletta ........... H04N 21/44016 713/186 |
| 2012/0182309 | A1 | 7/2012 | Griffin et al. |
| 2013/0013691 | A1* | 1/2013 | Whitnah ................ G06Q 10/10 709/204 |
| 2014/0195328 | A1* | 7/2014 | Ferens ............... G06Q 30/0271 705/14.41 |
| 2014/0365408 | A1* | 12/2014 | Snyder .................... G06F 19/00 706/12 |
| 2016/0125074 | A1 | 5/2016 | Chakra |
| 2016/0171540 | A1 | 6/2016 | Mangipudi et al. |
| 2016/0259492 | A1 | 9/2016 | Le et al. |
| 2017/0124196 | A1 | 5/2017 | Gustavsson et al. |
| 2017/0142044 | A1 | 5/2017 | Ball et al. |
| 2017/0323325 | A1 | 7/2017 | Hamedi |
| 2017/0262445 | A1 | 9/2017 | Jeon et al. |
| 2020/0050863 | A1* | 2/2020 | Wexler ................ G06F 16/9532 |

OTHER PUBLICATIONS

Ghandeharioun, Asma et al., "Objective Assessment of Depressive Symptoms with Machine Learning and Wearable Sensors Data", Proc. International Conference on Affective Computing and Intelligent Interaction (ACII), San Antonio, Texas. 2017. pp. 1-8.

Javier, , "What is beBee ? Why is beBee disrupting the current model of social media?", beBee Producer, bebee.com, Jul. 26, 2016; pp. 1-11.

Liu, Peter et al., "Generating Wikipedia by Summarizing Long Sequences", arXiv preprint arXiv:1801.10198 (2018), pp. 1-18.

Mudinas, Andrius et al., "Combining lexicon and learning based approaches for concept-level sentiment analysis", Proceedings of the first international workshop on issues of sentiment discovery and opinion mining. ACM, 2012. pp. 1-8.

Thelwall, Mike et al., "Sentiment strength detection in short informal text", Journal of the Association for Information Science and Technology 61.12 (2010): 2544-2558.

* cited by examiner

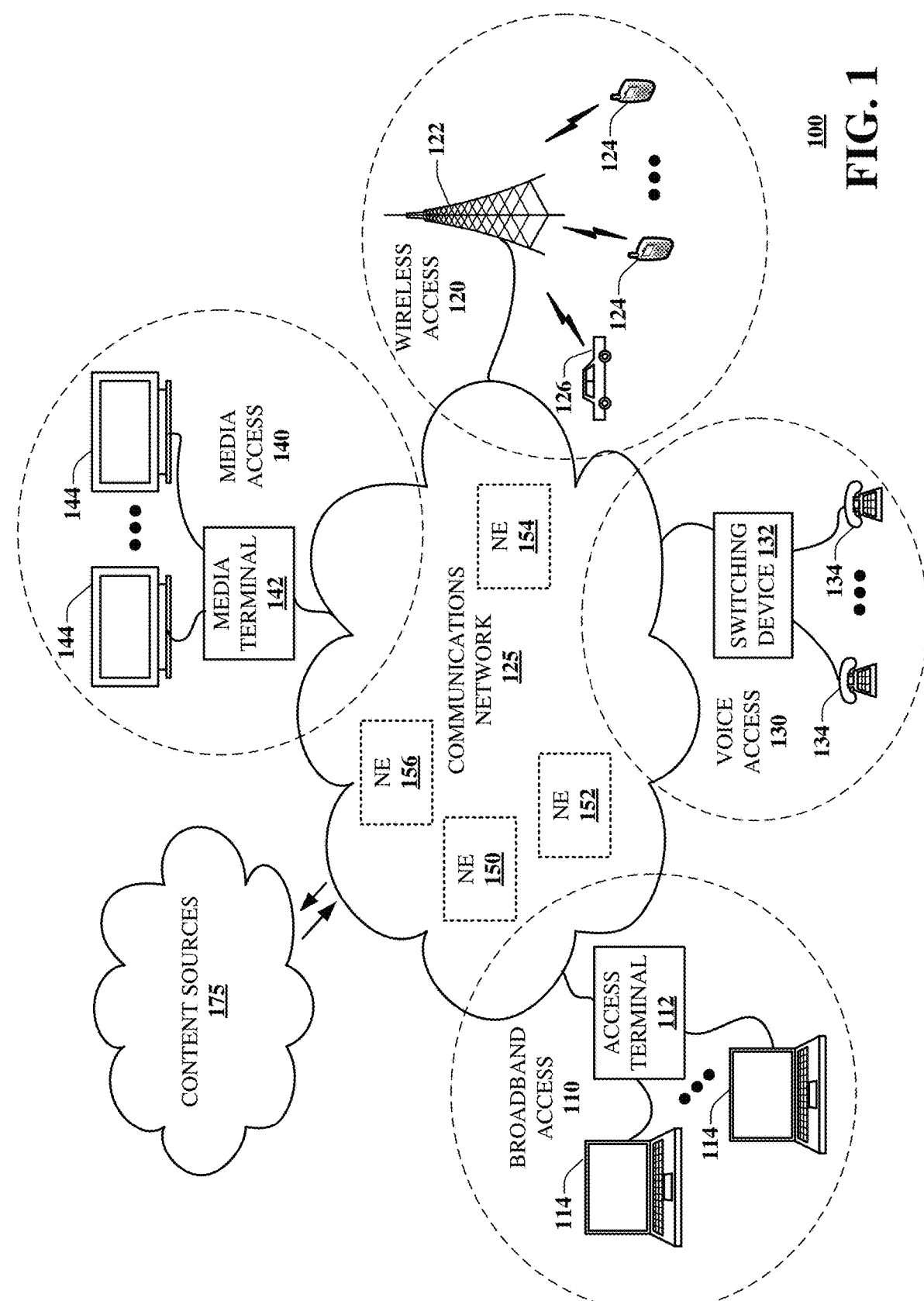

CONTENT DELIVERY AND CONSUMPTION WITH AFFINITY-BASED REMIXING

FIELD OF THE DISCLOSURE

The subject disclosure relates to modifying content consumed by users of mobile devices, and more particularly to a system for automatically modifying content for presentation on a social media platform.

BACKGROUND

A mobile communication device can provide various types of content to a user in a variety of physical and social environments. A user's reaction to, and affinity for, an item of content can be influenced by the user's real-time environment.

BRIEF DESCRIPTION OF THE DRAWINGS

Reference will now be made to the accompanying drawings, which are not necessarily drawn to scale, and wherein:

FIG. 1 is a block diagram illustrating an example, non-limiting embodiment of a communications network in accordance with various aspects described herein.

DETAILED DESCRIPTION

Figure 2A:
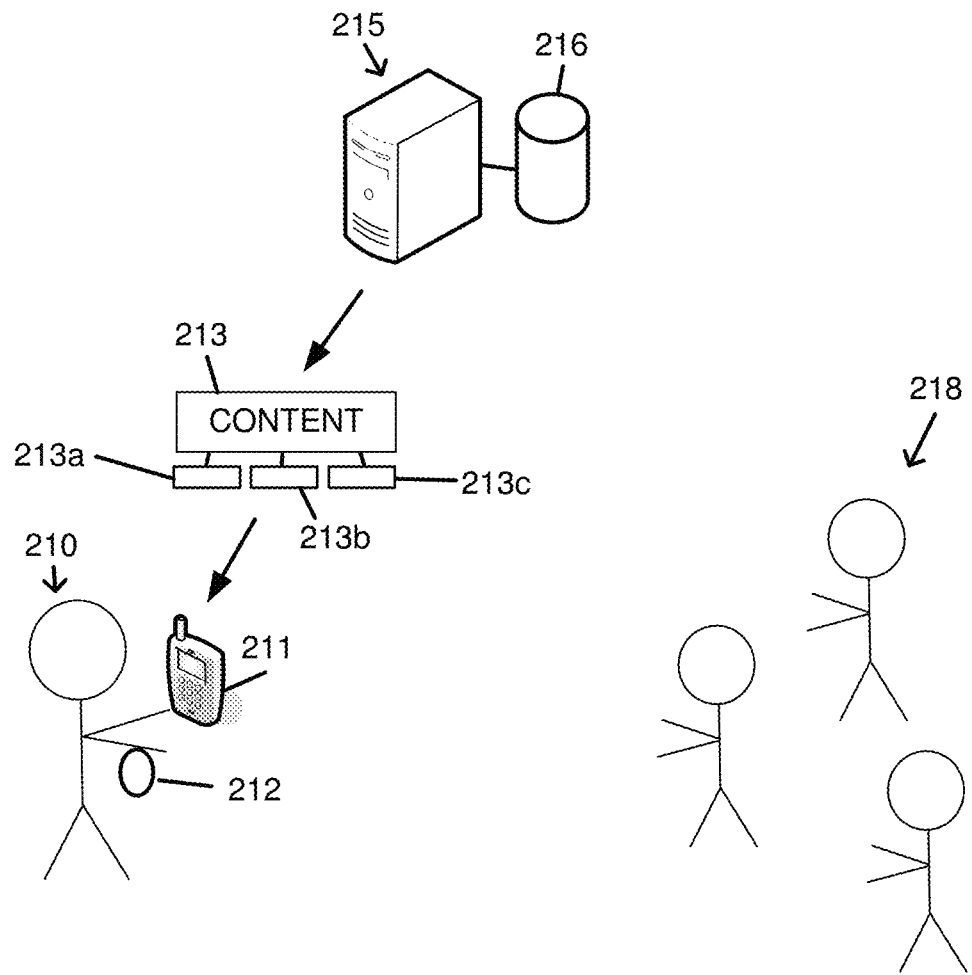
FIG. 2A is a block diagram illustrating an example, non-limiting embodiment of a system functioning within the communication network of FIG. 1 in accordance with various aspects described herein.

The subject disclosure describes, among other things, illustrative embodiments for a system and method for modifying content in real time as it is presented to a user, to enhance the user's affinity for that content. Other embodiments are described in the subject disclosure.

One or more aspects of the subject disclosure include a method comprising obtaining, by a processing system including a processor, environmental data for a physical environment of user equipment and for a social environment of a user associated with the user equipment; and providing content to the user equipment for presentation at the user equipment. The method also comprises obtaining, from sensors associated with the user, first reaction data indicating a first user reaction to a presentation of the content; analyzing the first reaction data to determine a first user affinity for the content in a context of the physical environment and the social environment; and modifying the content in response to the first user affinity, thereby generating, during the presentation, modified content for presentation at the user equipment; the modified content is substituted for currently presented content. The method further comprises obtaining, from the sensors, second reaction data indicating a second user reaction to the modified content; and analyzing the second reaction data to determine a second user affinity for the modified content. The method also comprises, responsive to the second user affinity being greater than the first user affinity, transmitting the modified content to equipment of a plurality of other users via a social network. The method further comprises analyzing affinity responses from the equipment of the other users regarding the modified content; identifying a set of other users having affinity responses within a predetermined range of the second user affinity, the user and the set of the plurality of other users accordingly forming an affinity group; and transmitting additional content to equipment of the affinity group.

One or more aspects of the subject disclosure include a device comprising a processing system and a memory that stores executable instructions; the instructions when executed by the processing system, facilitate performance of operations. The operations comprise obtaining environmental data for a physical environment of user equipment and for a social environment of a user associated with the user equipment; and providing content to the user equipment for presentation at the user equipment. The operations also comprise obtaining, from sensors associated with the user, first reaction data indicating a first user reaction to a presentation of the content, where the environmental data and the first reaction data are obtained at predetermined intervals during the presentation of the content; analyzing the first reaction data to determine a first user affinity for the content in a context of the physical environment and the social environment; and modifying the content in response to the first user affinity, thereby generating, during the presentation, modified content for presentation at the user equipment; the modified content is substituted for currently presented content. The operations also comprise obtaining, from the sensors, second reaction data indicating a second user reaction to the modified content; and analyzing the second reaction data to determine a second user affinity for the modified content; the first user affinity and the second user affinity have numeric values. The operations also comprise, responsive to the second user affinity being greater than the first user affinity, transmitting the modified content to equipment of a plurality of other users via a social network. The operations further comprise analyzing affinity responses from the equipment of the other users regarding the modified content; identifying a set of other users having affinity responses within a predetermined range of the second user affinity, the user and the set of the plurality of other users accordingly forming an affinity group; and transmitting additional content to equipment of the affinity group.

One or more aspects of the subject disclosure include a machine-readable storage medium comprising executable instructions that, when executed by a processing system including a processor, facilitate performance of operations. The operations comprise obtaining environmental data for a physical environment of user equipment and for a social environment of a user associated with the user equipment; and providing content to the user equipment for presentation at the user equipment. The operations also comprise obtaining, from sensors associated with the user, first reaction data indicating a first user reaction to a presentation of the content, where the sensors include biometric sensors; analyzing the first reaction data to determine a first user affinity for the content in a context of the physical environment and the social environment; and modifying the content in response to the first user affinity, thereby generating, during the presentation, modified content for presentation at the user equipment; the modified content is substituted for currently presented content. The operations also comprise obtaining, from the sensors, second reaction data indicating a second user reaction to the modified content; and analyzing the second reaction data to determine a second user affinity for the modified content. The operations also comprise, responsive to the second user affinity being greater than the first user affinity, transmitting the modified content to equipment of a plurality of other users via a social network. The operations further comprise analyzing affinity responses from the equipment of the other users regarding the modified content; identifying a set of other users having affinity responses within a predetermined range of the second user affinity, the user and the set of the plurality of other users accordingly forming an affinity group; and transmitting additional content to equipment of the affinity group.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment 201 of a system functioning within the communication network of FIG. 1 and providing content to equipment of a user, in accordance with various aspects described herein. As shown in FIG. 2A, computing device 215 (for example, a content server on communications network 125) provides content 213 to equipment 211 of a user 210. In this embodiment, the user equipment 211 is a mobile phone. Content 213 can include audio, text, video or a combination thereof.

The user's reaction while consuming content 213 can be recorded and analyzed by the system using input from biometric sensors (worn or carried by the user as indicated schematically at 212, or integrated into equipment 211). The biometric sensors capture a wide range of data including pulse, blood pressure, respiration, pupil dilation/constriction, voice cadence, walking gait/step size, etc. While the biometric data indicate the user's reaction automatically (that is, without deliberate input by the user), the user can also express his reaction using equipment 211 (for example, with spoken words or by entering a text message).

The reaction data, including the biometric data, can indicate not only "like/dislike" for the content by the user, but also a measurable degree of like or dislike; this is referred to herein as affinity for the content, which can be positive (the user "likes" or responds favorably to the content) or negative (the user "dislikes" or responds unfavorably to the content). In this embodiment, the affinity is determined in real time by comparing reaction data with a user profile stored in a database 216 accessible to the server 215 (e.g. comparing a baseline blood pressure reading with blood pressure while consuming the content). The user's affinity for the content can vary during presentation of the content; for example, the user may have different affinities for different segments 213*a*, 213*b*, 213*c* of content 213.

The user's affinity for the content can depend, at least in part, on environmental conditions, particularly if the user is outdoors and/or in a public place with the mobile phone. Environmental conditions can include both the physical environment (e.g. real-time conditions such as temperature, outdoor cloud cover, precipitation, indoor light level, etc.) and the social environment (e.g. the user's interactions with other persons 218). The social environment can include meetings in an instant messaging (IM) environment or chat room, as well as in-person meetings and conversations. In this embodiment, the user 210 can wear or carry sensors that capture environmental conditions in real time.

In a further embodiment, a camera worn or carried by the user 210, or integrated into mobile phone 211, can capture images of person(s) 218; these images may then be used to identify person(s) 218. The user's associations with those persons can be included in the user profile; the system can then analyze those associations to determine the user's affinity for his/her present social situation, which in turn can influence the user's affinity for the content being presented to the user at that time.

In another embodiment, the user 210 is engaged in a virtual reality (VR) session and has an affinity response to various components of his/her VR experience (avatars, virtual objects, virtual meetings/conversations, etc.).

Figure 2B:
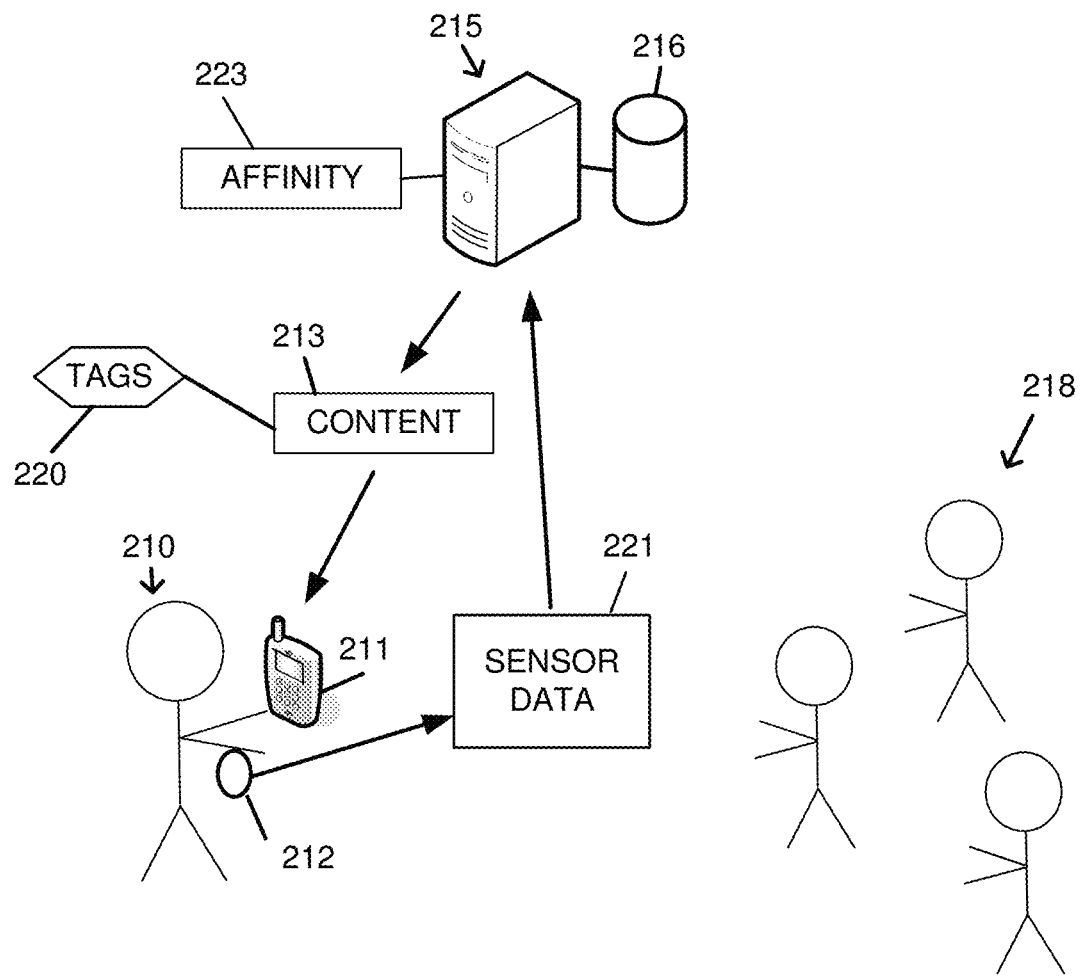
FIG. 2B is a block diagram illustrating an example, non-limiting embodiment of a system functioning within the communication network of FIG. 1 and performing analysis of sensor data regarding a reaction of the user to the provided content, in accordance with various aspects described herein.

FIG. 2B is a block diagram illustrating an example, non-limiting embodiment 202 of a system functioning within the communication network of FIG. 1 and performing analysis of sensor data regarding a reaction of the user to the provided content, in accordance with various aspects described herein. In this embodiment, mobile phone 211 transmits sensor data 221 to server 215; the sensor data indicates the reaction of user 210 in real time to the content 213 presented to the user.

The system analyzes the sensor data to determine the user's affinity 223 for the content. In an embodiment, the sensor data analysis is performed by the system at a remote computing device (not shown in FIG. 2B), while server 215 maintains a log of the presented content and the user affinity; an identification of the content, and the user affinity for that content, may be updated at regular intervals (e.g. 5 seconds).

In this embodiment, the content 213 has one or more tags 220 associated with the content. The system can extract specific tags and apply the user affinity to those tags (e.g. tags for visual, text and audio content); the content tags thus can form a record of the user's affinity for the content each time the content is consumed. In a further embodiment, the system stores in a database a record that includes (1) an identifier of the content consumed, (2) the user's affiniity for the content, (3) a user physical environment context for the content consumption (e.g, user location, time of day, light level, etc.), (4) a user social environment context for the content consumption (e.g. whether the user is interacting with a group).

In another embodiment, the system applies machine learning to content consumption; in particular, the system can review repeated consumption of particular items of content, or similar items of content (e.g. items of content having tags indicating that they belong to the same genre), and predict the user affinity for the next time such content is consumed.

In another embodiment, the system can collect and summarize content items previously created, having positive affinity and related to a particular event or time period (e.g. "last summer's visit to New York"). The system can then arrange that content, according to the affinity for each item, for repeated presentation to the user. Such arrangements of content, referred to herein as "curated content," may advantageously be shared with other users.

Figure 2C:
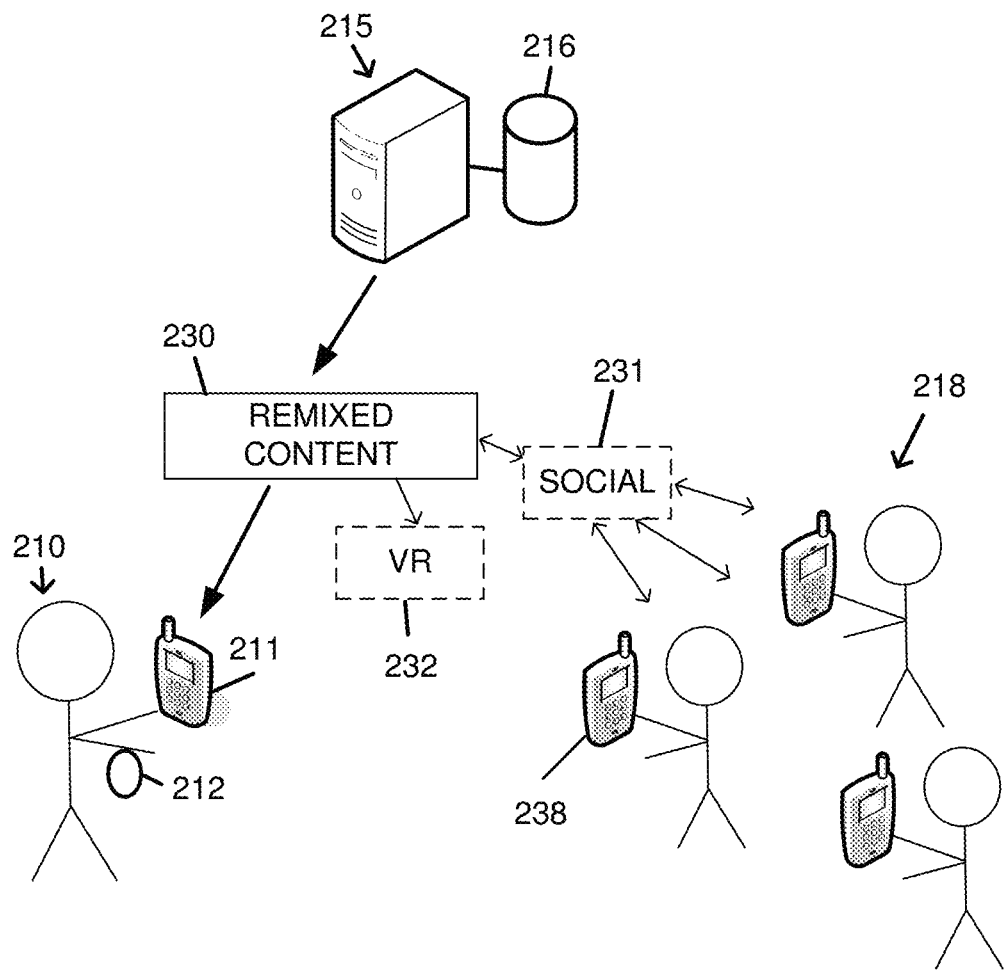
FIG. 2C is a block diagram illustrating an example, non-limiting embodiment of a system functioning within the communication network of FIG. 1 and providing remixed content to the equipment of the user, in accordance with various aspects described herein.

FIG. 2C is a block diagram illustrating an example, non-limiting embodiment 203 of a system functioning within the communication network of FIG. 1 and providing remixed content 230 to the equipment 211 of the user 210, in accordance with various aspects described herein. In this embodiment, the content provided to the user is automatically modified in order to enhance the user affinity. Modifying the content (also referred to herein as "remixing") can include, for example, highlighting, enlarging and/or bolding specific portions of text; highlighting and/or enlarging an object shown in a still picture or a video; changing the color scheme of a still picture or a video; adding product placements to still pictures or video; adding comments (text or audio) either from the user or from others; adding or substituting background audio in a video presentation; and/ or deleting or suppressing content portions with negative affinity. Since user reaction data is received and user affinity is analyzed automatically, the system receives real-time feedback regarding the effect of remixing on the user affinity.

The type of remixing can depend at least in part on previously performed remixing (e.g. changing purple to red in the background enhanced affinity the last time an item of video content was viewed), the user's physical and/or social environment, on known user preferences stored in the profile database, or any combination thereof.

In an embodiment, the remixing is performed on the content received at server 215 from the content provider (not shown). The equipment of user 210 thus receives the remixed content instead of the original content. In another embodiment, the remixing is performed by the user equipment on a copy of the original content transmitted by the server 215 to the user equipment. In another embodiment, a first remixing is performed at the server (e.g. changing background colors, applying stored user preferences), and a second remixing is performed at the user equipment (e.g. in response to real-time conditions detected by sensors 212).

If the user 210 requests repeated presentation of a particular item of content, remixing can be performed progressively to enhance the user affinity. For example, portions of a picture that elicit a positive affinity response may be shown with more vibrant colors, while other portions with lower or negative affinity may be reduced in size, shown in grayscale and finally eliminated from the presentation. In another example, a picture of a product that previously elicited a positive affinity response can be inserted into the current content, and then highlighted in subsequent presentations of that content.

As shown schematically in FIG. 2C, the remixed content 230 can be shared with a group of other users 218 via a social network 231 over which those users communicate using their respective devices 238. In an embodiment, each of users 218 has an affinity response to the remixed content 230, which is then automatically remixed and provided to the respective devices 238. Accordingly, there will in general be as many remixed versions generated as there are users sharing the content. A user in communication with the group and sharing the content (for example, user 210) can experience these remixed versions as new content.

In another embodiment, the system searches for additional content that has a user affinity similar to that of the remixed content 230, and recommends that content to the other users 218. It will be appreciated that discovery, recommendation and sharing of content can be accomplished using either proximal links (e.g. meeting in-person) or global links.

In another embodiment, user 210 creates new content by capturing images (or otherwise acquiring content) using equipment 211, and recording his/her impressions regarding those images. The user's affinities for these images can then be automatically determined and logged by the system. The content can be automatically remixed, for example by highlighting images or portions of images where the affinity is enhanced. Alternatively, images can be highlighted based on positive affinities previously stored in the user profile regarding similar images. The remixed images can thus form a real-time stream of content with positive affinity for user 210 (an "affinity stream" for the user) and be shared with other users via a social network. In this embodiment, the system can provide different types of highlighting based on the nature of the image. For example, an image of a product eliciting a positive affinity response can be highlighted with an orange halo (indicating "I want to buy this product"), while an image of a celebrity can by highlighted with a purple halo (indicating "I want to share gossip about this person").

In a further embodiment, user 210 participates in a virtual reality (VR) session 232 in which various virtual objects are presented to the user, virtual conversations occur, etc. The user will have real-time reactions to these experiences; accordingly, an affinity can be determined for various different elements in the VR session, and remixing can be automatically performed to modify the user's VR experience. In particular, an avatar associated with another participant in the VR session may have its appearance altered as presented to the user 210.

Figure 2D:
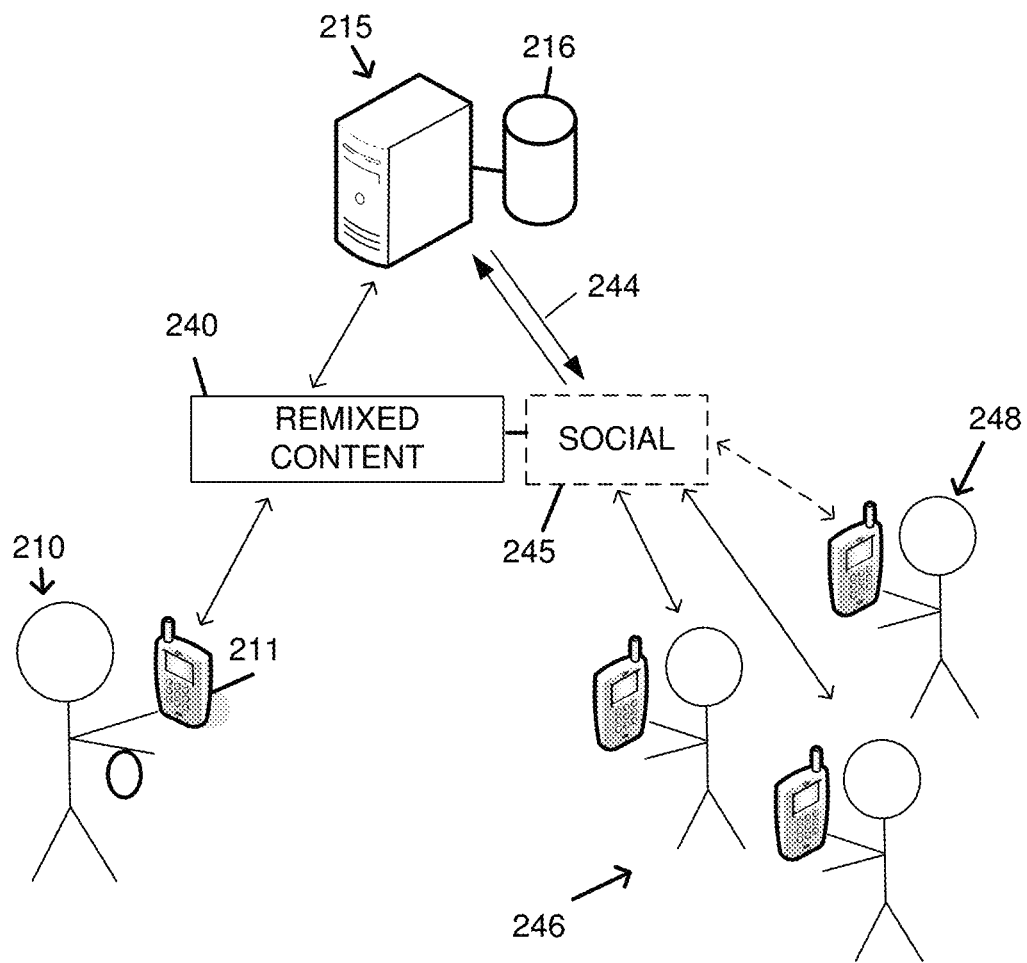
FIG. 2D is a block diagram illustrating an example, non-limiting embodiment of a system functioning within the communication network of FIG. 1 and facilitating sharing the remixed content via a social network, in accordance with various aspects described herein.

FIG. 2D is a block diagram illustrating an example, non-limiting embodiment 204 of a system functioning within the communication network of FIG. 1 and facilitating sharing remixed content 240 in an affinity group via a social network, in accordance with various aspects described herein.

As shown schematically in FIG. 2D, an affinity stream 244, generated by the system and including remixed content from user 210, is shared with other users via social network 245. The affinity responses from the other users are received and analyzed by the system. In particular, the system compares the affinities of the various users to determine whether they are consistent with each other. In this embodiment, users 246, whose affinity responses are within a predetermined range of the affinities in the affinity stream 244 of user 210, form an affinity group with user 210 and continue to share affinity stream 244 while contributing their own affinity streams; user 248, whose affinity response is not consistent with those of users 210 and 246, will have his/her affinity stream no longer shared and thus be excluded from the affinity group.

In a further embodiment, the system can monitor affinities for shared content by individuals in the affinity group, and automatically provide content and/or recommendations when inconsistent or negative affinity is shown by a group member. For example, if a member of the affinity group has negative affinities (or positive affinities below a predetermined threshold) for a certain period of time (e.g. two days), the system can automatically recommend content to that user, provide content previously determined to elicit positive affinity, or alert others in the group to offer attention to that member.

In another embodiment, the system can develop a collective profile for the affinity group, and provide recommendations and/or predictions based on that profile. For example, members of a group that likes to gather for a happy hour at a restaurant can have an overlay applied to their mapping applications that highlights the location of the restaurant, and another overlay applied to their calendars that highlights the time for the happy hour.

The affinity streams provided to the user 210 from the other group members 246, can be remixed, curated and stored by user 210, so that experiences of another user can be enjoyed by user 210 according to his/her individual profile. In a further embodiment, the system can automatically remix content provided by any of the group members according to the collective profile.

In another embodiment, the server 215 is controlled by an advertising entity seeking to engage each user uniquely. In this embodiment, the affinity responses of an individual user (e.g. user 210) to content offered via the server will influence further presentation of content to that user. The system thus enables the advertiser to edit an advertisement in real time, based on the individual user's affinities. Accordingly, two users can simultaneously begin consuming a product advertisement on their respective device by viewing the same image, but view different images at a later time during the presentation of the advertisement.

Figure 2E:
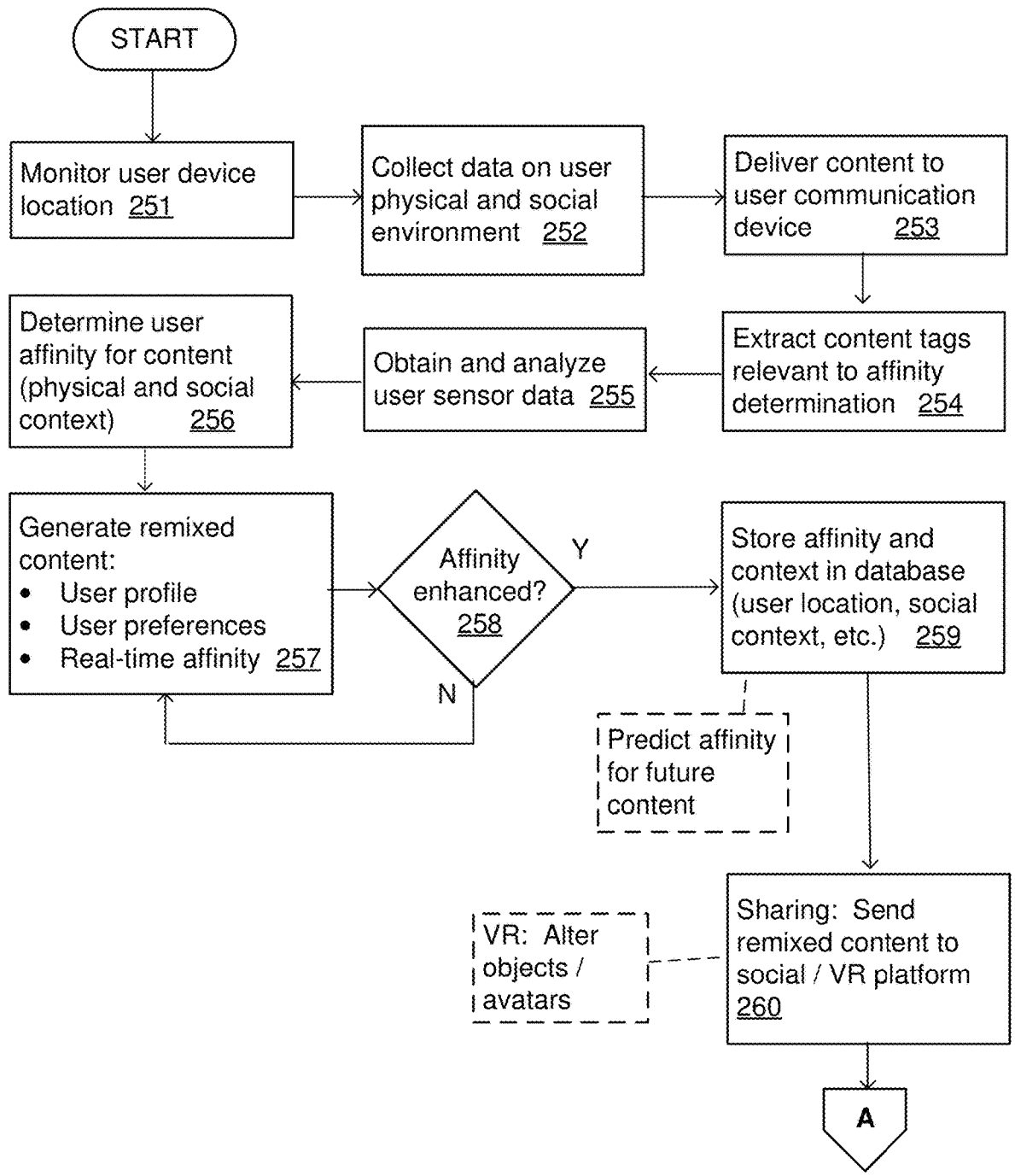
FIGS. 2E-2F are connected flowcharts depicting an illustrative embodiment of a method in accordance with various aspects described herein.
Figure 2F:
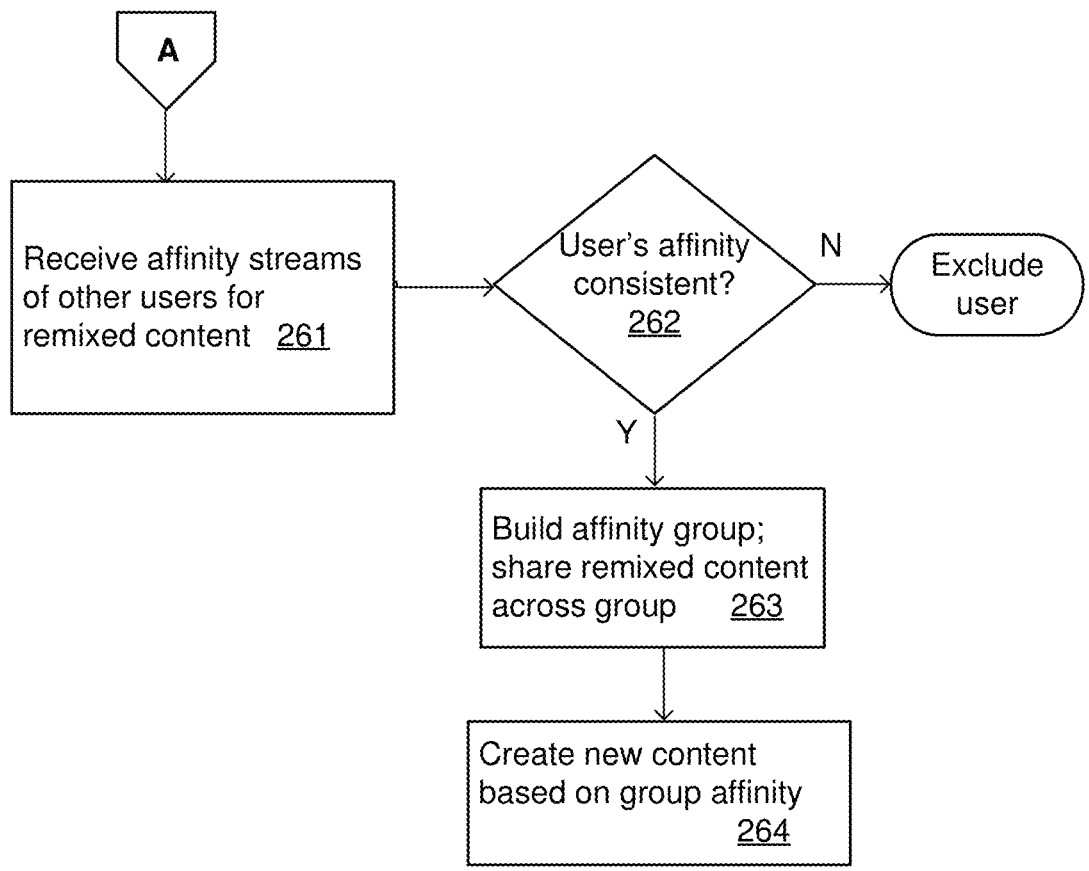

FIGS. 2E-2F are connected flowcharts 205-206 depicting an illustrative embodiment of a method in accordance with various aspects described herein. The method relates to an individual user of the system (e.g. a network subscriber) having a mobile communication device (e.g. a smart phone).

The system monitors the location of the user's communication device (step 251) and collects data regarding the user's physical and/or social environment (step 252). In an embodiment, the location monitoring and environmental data collection can be performed at regular time intervals. The system then delivers content to the user (step 253) and extracts tags to which an affinity can be applied (step 254).

The system analyzes sensor data from the user and/or the user equipment (step 255) and determines the user's affinity for the content (step 256). The user affinity may have a context; that is, the affinity for a given content item can be at least partly influenced by the user's physical and/or social environment.

The system generates remixed content based on the affinity response (step 257). Remixing can be based on the current user profile and on user preferences previously stored, in addition to the real-time affinity. The remixing can include altering the content in a number of ways (e.g. highlighting text or images, enlarging or reducing portions of text or images, substituting colors, adding or substituting audio, etc.).

The system continues to obtain and analyze sensor data, and determines whether the remixed content enhances the user's affinity response (step 258). In an embodiment, the user affinity is expressed as a numerical value (e.g. +100 to −100) continuously varying with time. The affinity is then stored in a database (step 259), along with the tags relating to the content and the user context (time of day, physical and social environments, etc.). In an embodiment, the stored affinities can be used to predict the user affiniity for other content consumed at another time. The system then sends the remixed content to a social or VR platform for sharing with other users (step 260). In an embodiment, the remixed content is part of an affinity stream associated with the original user (e.g. user 210 making the initial affinity response). In another embodiment, the original user participates in a VR session; objects appearing to the user, including other users' avatars, can be altered in accordance with the user affinities.

The other users (subscribers to the social network or participants in the VM session) consume the remixed content (step 261); their affinity responses are obtained and analyzed by the system. In an embodiment, the remixed content is transmitted to equipment of a target group of users (friends of the user whose affinity response originated the remixed content, and/or users predicted by the system to have a positive affinity based on affinities previously analyzed for those users). A user whose affinity response is not consistent with others in the group (step 262) is excluded from receiving the affinity stream further.

The system builds an affinity group (step 263) based on the users' affinities for the content/affinity stream associated with the original user. In an embodiment, the original user (user 210 in FIGS. 2A-2D) can add to the group other users known to the original user. The system then makes the remixed content available to the members of the affinity group (step 263). Any member of the group can then modify the shared remixed content, thus generating new content accessible to all members of the group (step 264). In a further embodiment, the system can monitor all of the users in the group to obtain a group affinity for items of content, in addition to the individual user affinity; the system accordingly can predict the group affinity and automatically modify content being presented to the group.

While for purposes of simplicity of explanation, the respective processes are shown and described as a series of blocks in FIGS. 2E-2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
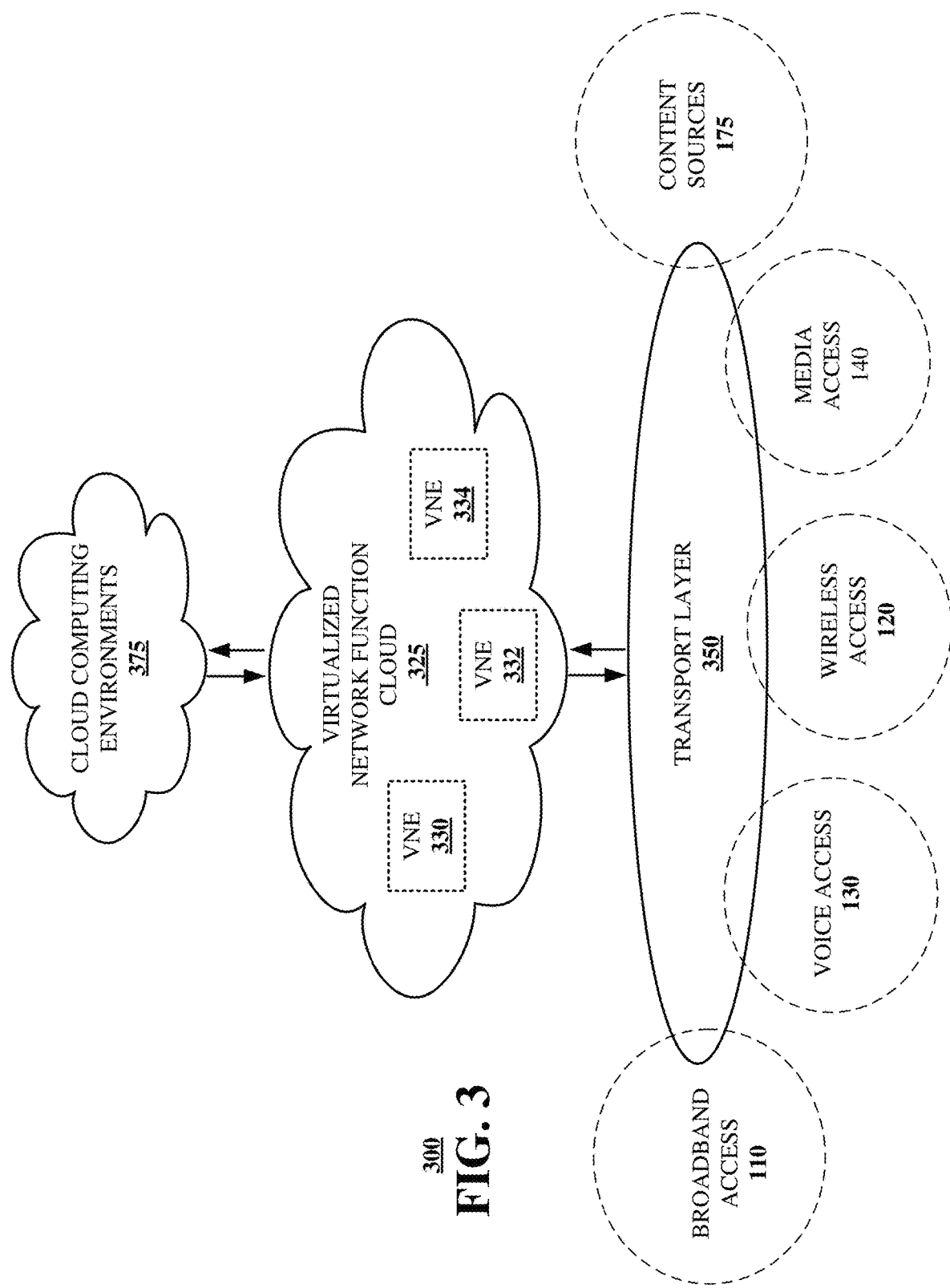
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 201-204, and methods 205-206 presented in FIGS. 1, 2A-2D and 2E-2F.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
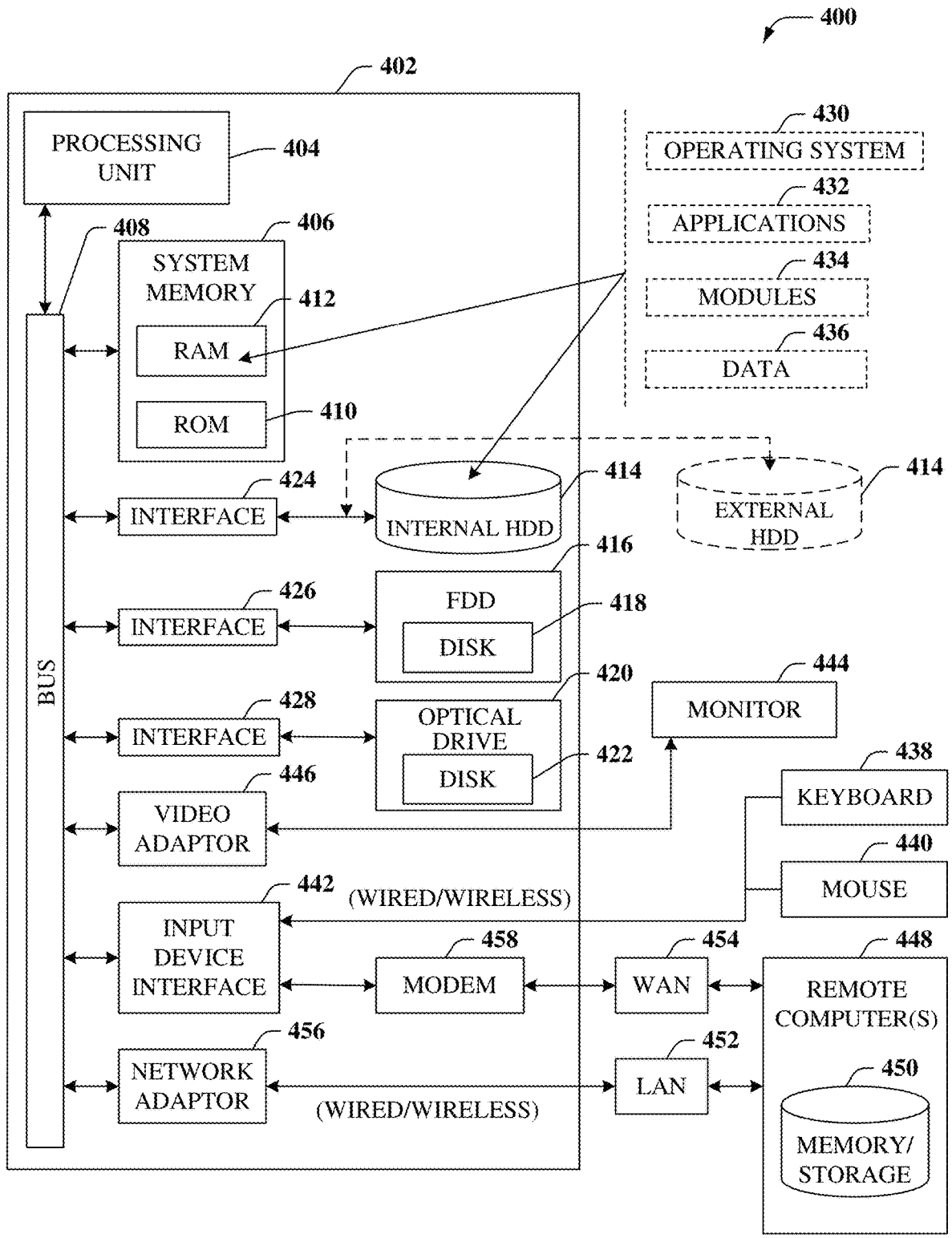
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
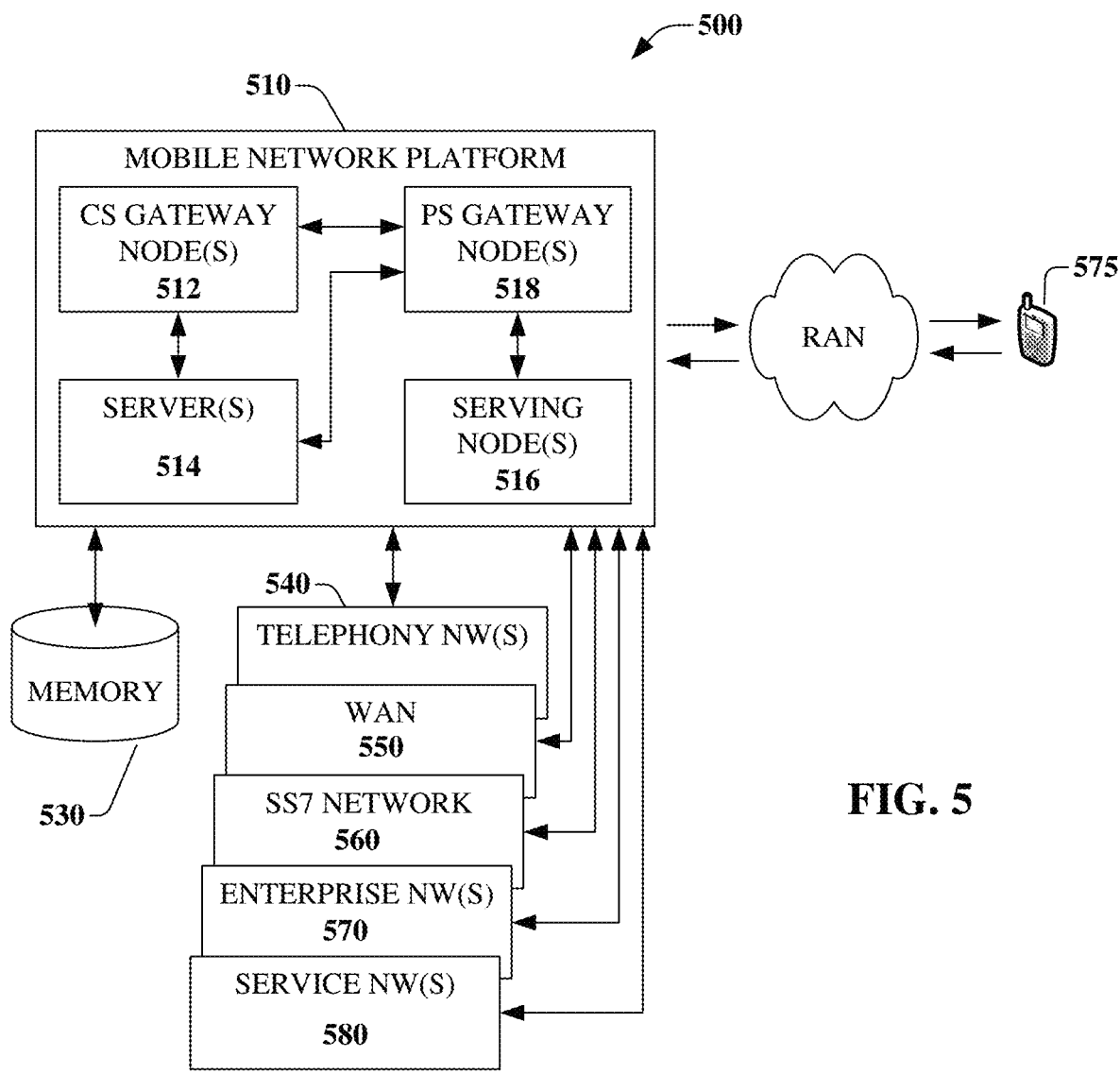
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
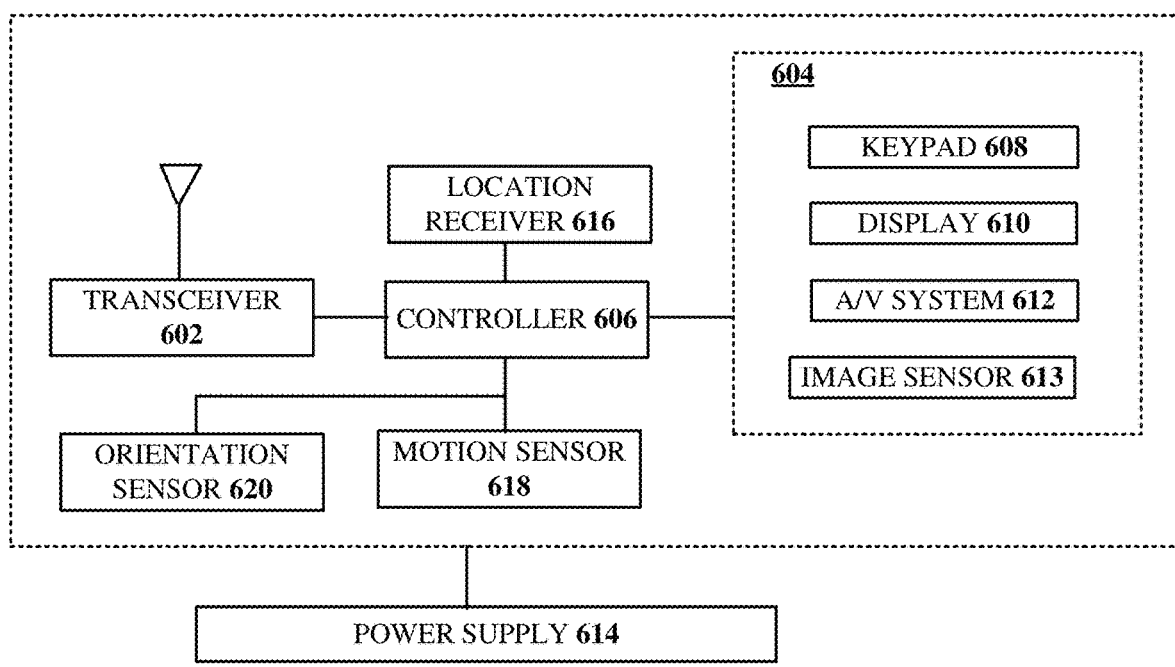
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   obtaining, by a processing system including a processor, environmental data for a physical environment of user equipment and for a social environment of a user associated with the user equipment;
   providing, by the processing system, content to the user equipment for presentation at the user equipment;
   obtaining, by the processing system from sensors associated with the user, first reaction data indicating a first user reaction to a presentation of the content;
   analyzing, by the processing system, the first reaction data to determine a first user affinity for the content in a context of the physical environment and the social environment, the analyzing comprising analyzing associations of the user to determine a user affinity for a present social situation of the user;
   automatically modifying, by the processing system, the content in response to the first user affinity, to generate, during the presentation, modified content for presentation at the user equipment, wherein the modified content is substituted for currently presented content;
   obtaining, by the processing system from the sensors, second reaction data indicating a second user reaction to the modified content;
   analyzing, by the processing system, the second reaction data to determine a second user affinity for the modified content in the context of the physical environment and the social environment, wherein the first reaction data and the second reaction data include biometric data automatically obtained from the sensors, and wherein the first user affinity and the second user affinity are determined by comparing respectively the first reaction data and the second reaction data with a user profile;
   responsive to the second user affinity being greater than the first user affinity:
   transmitting, by the processing system, the modified content to equipment of a plurality of other users via a social network, resulting in transmitted modified content;
   analyzing, by the processing system, affinity responses from the equipment of the plurality of other users regarding the transmitted modified content;
   identifying, by the processing system, a set of the plurality of other users having affinity responses within a predetermined range of the second user affinity, the user and the set of the plurality of other users accordingly forming an affinity group including an affinity group member other than the user;
   receiving, by the processing system, new content from equipment of the affinity group member, wherein the new content is generated by the equipment of the affinity group member automatically modifying the transmitted modified content according to the affinity response of the affinity group member; and
   transmitting, by the processing system, the new content to equipment of additional members of the affinity group.

2. The method of claim 1, further comprising determining, by the processing system, a collective affinity response of the affinity group to a presentation of the new content.

3. The method of claim 2, wherein the affinity group comprises a plurality of members, and wherein the collective affinity response is determined by analyzing aggregated reaction data of the members of the affinity group.

4. The method of claim 2, further comprising modifying, by the processing system, the new content in accordance with the collective affinity response, thereby generating modified new content for presentation at the equipment of the affinity group.

5. The method of claim 1, wherein the content is provided in a virtual reality (VR) session that includes the plurality of other users, and wherein the modifying comprises altering an appearance of an avatar associated with one of the plurality of other users.

6. The method of claim 1, wherein the content has a tag associated therewith, and further comprising:
   storing, by the processing system, an identifier of the content and the tag in a database; and
   storing, by the processing system, the first user affinity in the database, wherein the first user affinity is associated with the identifier and with the tag.

7. The method of claim 6, further comprising predicting, by the processing system, a future user affinity for future content presented at the user equipment, the predicting based at least in part on the stored first user affinity.

8. The method of claim 1, wherein the associations of the user are included in the user profile.

9. The method of claim 1, wherein the content comprises first images, and wherein affinities of the user regarding the first images are based in part on affinities previously stored in the user profile regarding second images similar to the first images.

10. The method of claim 1, wherein the content comprises audiovisual content, and wherein the modifying comprises highlighting an image in a video portion of the content, enlarging or shrinking the image, changing a color of the image, changing a background color of the video portion of the content, changing an audio portion of the content, or a combination thereof.

11. A device comprising:
    a processing system including a processor; and
    a memory that stores executable instructions that, when executed by the processing system, facilitate performance of operations comprising:
    obtaining environmental data for a physical environment of user equipment and for a social environment of a user associated with the user equipment;
    providing content to the user equipment for presentation at the user equipment;
    obtaining, via sensors associated with the user, first reaction data indicating a first user reaction to a presentation of the content, wherein the environmental data and the first reaction data are obtained at predetermined intervals during the presentation of the content;
    analyzing the first reaction data to determine a first user affinity for the content in a context of the physical environment and the social environment, the analyzing comprising analyzing associations of the user to determine a user affinity for a present social situation of the user;
    automatically modifying the content in response to the first user affinity, to generate, during the presentation, modified content for presentation at the user equipment, wherein the modified content is substituted for currently presented content;
    obtaining, via the sensors, second reaction data indicating a second user reaction to the modified content;
    analyzing the second reaction data to determine a second user affinity for the modified content in the context of the physical environment and the social environment, wherein the first reaction data and the second reaction data include biometric data automatically obtained from the sensors, and wherein the first user affinity and the second user affinity are determined by comparing respectively the first reaction data and the second reaction data with a user profile, wherein the first user affinity and the second user affinity have numeric values;

responsive to the second user affinity being greater than the first user affinity:

transmitting the modified content to equipment of a plurality of other users via a social network, resulting in transmitted modified content;

analyzing affinity responses from the equipment of the plurality of other users regarding the transmitted modified content;

identifying a set of the plurality of other users having affinity responses within a predetermined range of the second user affinity, the user and the set of the plurality of other users accordingly forming an affinity group including an affinity group member other than the user;

receiving new content from equipment of the affinity group member, wherein the new content is generated by the equipment of the affinity group member automatically modifying the transmitted modified content according to the affinity response of the affinity group member; and transmitting the new content to equipment of additional members of the affinity group.

12. The device of claim 11, wherein the operations further comprise determining a collective affinity response of the affinity group to a presentation of the new content.

13. The device of claim 11, wherein the content is provided in a virtual reality (VR) session that includes the plurality of other users, and wherein the modifying comprises altering an appearance of an avatar associated with one of the plurality of other users.

14. The device of claim 11, wherein the content has a tag associated therewith, and wherein the operations further comprise:

storing an identifier of the content and the tag in a database; and storing the first user affinity in the database, wherein the first user affinity is associated with the identifier and with the tag.

15. The device of claim 11, wherein the content comprises audiovisual content, and wherein the modifying comprises highlighting an image in a video portion of the content, enlarging or shrinking the image, changing a color of the image, changing a background color of the video portion of the content, changing an audio portion of the content, or a combination thereof.

16. A non-transitory machine-readable storage medium comprising executable instructions that, when executed by a processing system including a processor, facilitate performance of operations comprising:

obtaining environmental data for a physical environment of user equipment and for a social environment of a user associated with the user equipment;

providing content to the user equipment for presentation at the user equipment;

obtaining, via sensors associated with the user, first reaction data indicating a first user reaction to a presentation of the content, the sensors comprising biometric sensors;

analyzing the first reaction data to determine a first user affinity for the content in a context of the physical environment and the social environment, the analyzing comprising analyzing associations of the user to determine a user affinity for a present social situation of the user;

automatically modifying the content in response to the first user affinity, to generate, during the presentation, modified content for presentation at the user equipment, wherein the modified content is substituted for currently presented content;

obtaining, via the sensors, second reaction data indicating a second user reaction to the modified content;

analyzing the second reaction data to determine a second user affinity for the modified content in the context of the physical environment and the social environment, wherein the first reaction data and the second reaction data include biometric data automatically obtained from the biometric sensors, and wherein the first user affinity and the second user affinity are determined by comparing respectively the first reaction data and the second reaction data with a user profile;

responsive to the second user affinity being greater than the first user affinity:

transmitting the modified content to equipment of a plurality of other users via a social network, resulting in transmitted modified content;

analyzing affinity responses from the equipment of the plurality of other users regarding the transmitted modified content;

identifying a set of the plurality of other users having affinity responses within a predetermined range of the second user affinity, the user and the set of the plurality of other users accordingly forming an affinity group including an affinity group member other than the user;

receiving new content from equipment of the affinity group member, wherein the new content is generated by the equipment of the affinity group member automatically modifying the transmitted modified content according to the affinity response of the affinity group member; and transmitting the new content to equipment of additional members of the affinity group.

17. The non-transitory machine-readable storage medium of claim 16, wherein the content is provided in a virtual reality (VR) session that includes the plurality of other users, and wherein the modifying comprises altering an appearance of an avatar associated with one of the plurality of other users.

18. The non-transitory machine-readable storage medium of claim 16, wherein the content has a tag associated therewith, and wherein the operations further comprise:

storing an identifier of the content and the tag in a database; and storing the first user affinity in the database, wherein the first user affinity is associated with the identifier and with the tag.

19. The non-transitory machine-readable storage medium of claim 16, wherein the first user affinity and the second user affinity have numeric values, and wherein the environmental data and the first reaction data are obtained at predetermined intervals during the presentation of the content.

20. The non-transitory machine-readable storage medium of claim 16, wherein the content comprises audiovisual content, and wherein the modifying comprises highlighting an image in a video portion of the content, enlarging or shrinking the image, changing a color of the image, changing a background color of the video portion of the content, changing an audio portion of the content, or a combination thereof.

\* \* \* \* \*